US012581550B1

(12) United States Patent
Brassard et al.

(10) Patent No.: US 12,581,550 B1
(45) Date of Patent: Mar. 17, 2026

(54) SYSTEMS AND TECHNIQUES FOR AUTONOMOUS VEHICLE NETWORK SELECTION BASED ON PASSENGER MOBILE DEVICE FEEDBACK

(71) Applicant: GM Cruise Holdings LLC, San Francisco, CA (US)

(72) Inventors: Joseph Brassard, Somerville, MA (US); Kurt VonEhr, Oakland, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 422 days.

(21) Appl. No.: 18/353,750

(22) Filed: Jul. 17, 2023

(51) Int. Cl.
*H04W 76/11* (2018.01)
*H04W 4/40* (2018.01)
*H04W 76/15* (2018.01)
*H04W 76/30* (2018.01)

(52) U.S. Cl.
CPC .............. *H04W 76/11* (2018.02); *H04W 4/40* (2018.02); *H04W 76/15* (2018.02); *H04W 76/30* (2018.02)

(58) Field of Classification Search
None
See application file for complete search history.

(56) References Cited

U.S. PATENT DOCUMENTS

| | | | | |
|---|---|---|---|---|
| 2018/0317067 A1* | 11/2018 | Ameixieira | ............. | H04W 4/50 |
| 2019/0166577 A1* | 5/2019 | Tombaz | ................ | H04W 68/02 |
| 2022/0135082 A1* | 5/2022 | Dumas | ................... | G08G 1/133 701/26 |
| 2022/0297698 A1* | 9/2022 | Gao | .................. | B60W 60/0021 |
| 2022/0329993 A1* | 10/2022 | Rawat | ..................... | H04W 4/50 |

* cited by examiner

*Primary Examiner* — Saumit Shah

(74) *Attorney, Agent, or Firm* — Honigman LLP; Matthew H. Szalach; Jonathan P. O'Brien

(57) ABSTRACT

Systems and techniques are provided for an autonomous vehicle (AV) to select a mobile network. An example method can include establishing a connection between the AV and a mobile device associated with a passenger of the AV; identifying, using the connection, a first mobile network associated with the mobile device; determining that the first mobile network associated with the mobile device is different than a second mobile network associated with the AV; determining, based on a first network indicator associated with the first mobile network and a second network indicator associated with the second mobile network, that the first mobile network is preferable to the second mobile network; and initiating a mobile connection between the AV and the first mobile network.

20 Claims, 5 Drawing Sheets

400

Establish A Connection Between The Autonomous Vehicle And A Mobile Device Associated With A Passenger Of The Autonomous Vehicle
402

Identify, Using The Connection, A First Mobile Network Operator Associated With The Mobile Device, Wherein The First Mobile Network Operator Is Configured To Provide A First Mobile Connection Between The Mobile Device And A First Mobile Network
404

Determine That The First Mobile Network Operator Associated With The Mobile Device Is Different Than A Second Mobile Network Operator Associated With The Autonomous Vehicle, Wherein The Second Mobile Network Operator Is Configured To Provide A Second Mobile Connection Between The Autonomous Vehicle And A Second Mobile Network
406

Determine, Based On A First Network Indicator Associated With The First Mobile Network And A Second Network Indicator Associated With The Second Mobile Network, That The First Mobile Connection Is Preferable To The Second Mobile Connection
408

Initiate A Third Mobile Connection Between The Autonomous Vehicle And The First Mobile Network Operated By The First Mobile Network Operator
410

400

Establish A Connection Between The Autonomous Vehicle
And A Mobile Device Associated With A Passenger Of The
Autonomous Vehicle
<u>402</u>

Identify, Using The Connection, A First Mobile Network
Operator Associated With The Mobile Device, Wherein The
First Mobile Network Operator Is Configured To Provide A
First Mobile Connection Between The Mobile Device And A
First Mobile Network
<u>404</u>

Determine That The First Mobile Network Operator
Associated With The Mobile Device Is Different Than A
Second Mobile Network Operator Associated With The
Autonomous Vehicle, Wherein The Second Mobile Network
Operator Is Configured To Provide A Second Mobile
Connection Between The Autonomous Vehicle And A
Second Mobile Network
<u>406</u>

Determine, Based On A First Network Indicator Associated
With The First Mobile Network And A Second Network
Indicator Associated With The Second Mobile Network, That
The First Mobile Connection Is Preferable To The Second
Mobile Connection
<u>408</u>

Initiate A Third Mobile Connection Between The
Autonomous Vehicle And The First Mobile Network
Operated By The First Mobile Network Operator
<u>410</u>

FIG. 4

SYSTEMS AND TECHNIQUES FOR AUTONOMOUS VEHICLE NETWORK SELECTION BASED ON PASSENGER MOBILE DEVICE FEEDBACK

BACKGROUND

1. Technical Field

The present disclosure generally relates to autonomous vehicles and, more specifically, to controlling selecting a network for communicating with an autonomous vehicle based on feedback from a passenger mobile device.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 4 is a flowchart illustrating another example process for an autonomous vehicle to select a network based on feedback from a passenger mobile device, in accordance with some examples of the present disclosure.

DETAILED DESCRIPTION

Figure 1:
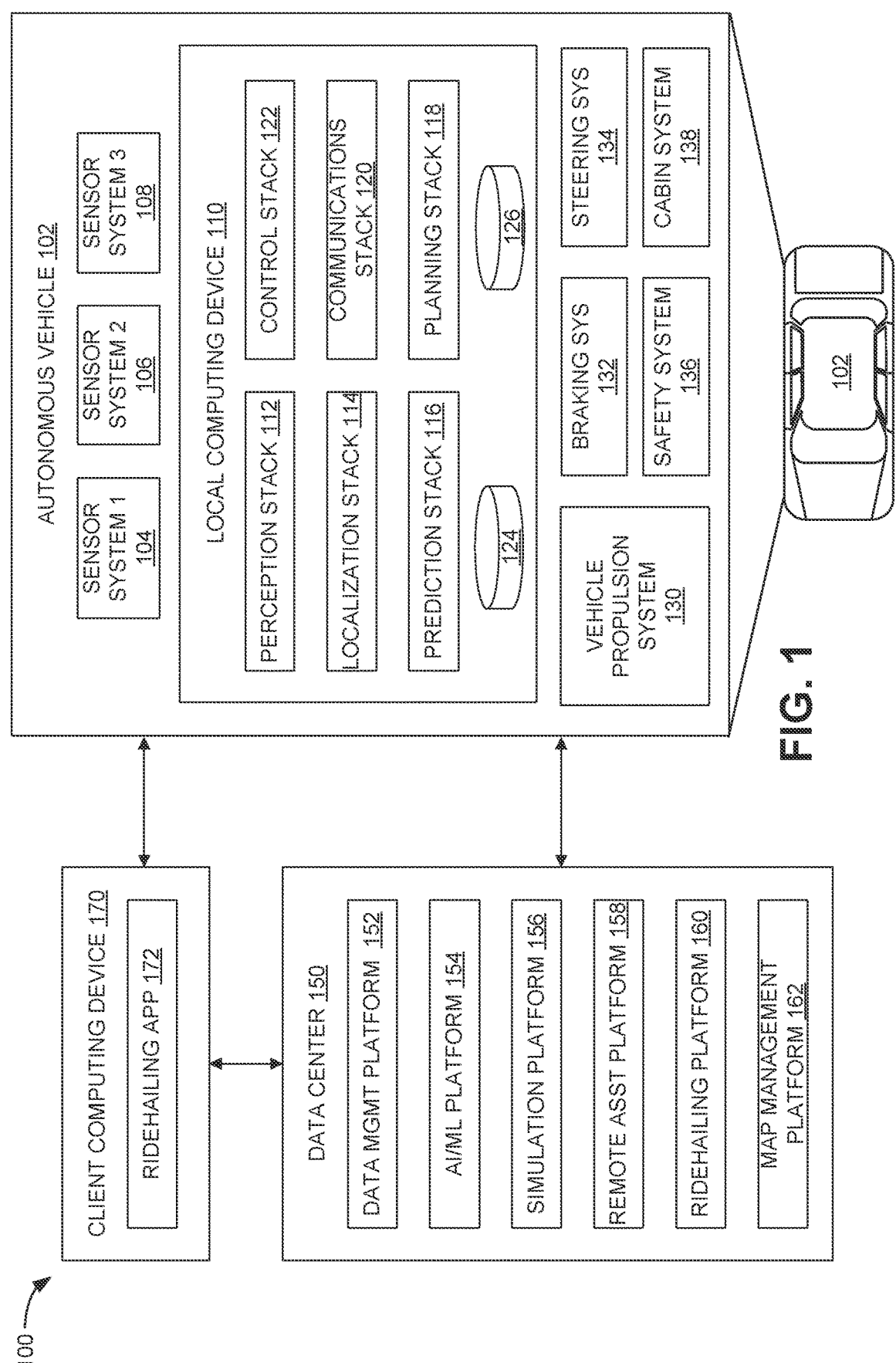
FIG. 1 is a diagram illustrating an example system environment that can be used to facilitate autonomous vehicle (AV) navigation and routing operations, in accordance with some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. For example, AVs can include sensors such as a camera sensor, a LIDAR sensor, and/or a RADAR sensor, amongst others, which the AVs can use to collect data and measurements that are used for various AV operations. The sensors can provide the data and measurements to an internal computing system of the autonomous vehicle, which can use the data and measurements to control mechanical systems of the autonomous vehicle, such as a vehicle propulsion system, a braking system, and/or a steering system, etc.

In some cases, an autonomous vehicle may include one or more devices that provide access to a wireless network. For example, an autonomous vehicle may include a network access device (NAD) that can be used to gain access to a mobile network operator (MNO). Such wireless connections may be used to provide connectivity between the autonomous vehicle and a fleet management server, for example.

In some aspects, the wireless connection between the autonomous vehicle and the MNO may be degraded. For instance, the autonomous vehicle may be travelling through an area that has poor coverage (e.g., low signal strength, low bandwidth, etc.). In some examples, the autonomous vehicle may be equipped with a NAD that has dual sim dual standby (DSDS) functionality. That is, the autonomous vehicle may be able to switch from a first MNO to a second MNO. Consequently, an autonomous vehicle may be configured to switch to the second MNO when the connection to the first MNO is deficient.

However, undergoing a switch from a first MNO to a second MNO can be somewhat time consuming. In some cases, the switch can take approximately 30 seconds. Further, there is a risk that switching to the second MNO will not provide improved quality of service. That is, the autonomous vehicle does not have knowledge of the network conditions associated with the second MNO prior to initiating the switch. Therefore, the autonomous vehicle may end up switching to an MNO that has even worse performance than the original MNO. Such a scenario can result in additional time in which the autonomous vehicle is outside of network coverage as the autonomous vehicle would then initiate a switch back to the original MNO, which would again take a significant amount of time.

Systems and techniques are provided herein for an autonomous vehicle to select a network based on feedback from a passenger mobile device. In some aspects, the autonomous vehicle can establish a connection with a passenger device using a wireless or a wired protocol. For instance, the autonomous vehicle and the passenger device can connect using a Bluetooth™ connection, a Wi-Fi connection, an ultra-wideband (UWB) connection, and/or a universal serial bus (USB) connection.

In some aspects, the autonomous vehicle can use the connection to the passenger device to determine whether the passenger device is associated with the same MNO as the MNO that is serving the autonomous vehicle. In some aspects, if the MNO serving the passenger device is different, the autonomous vehicle can determine one or more network indicators associated with the MNO serving the passenger device and compare them to network indicators associated with the MNO serving the autonomous vehicle. Examples of such network indicators can include signal strength, bandwidth, latency, roundtrip time, radio access technology (RAT), etc.

In some cases, the autonomous vehicle can use the network indicators to determine whether the MNO associated with the passenger device is preferable to the MNO associated with the autonomous vehicle. In some examples, the autonomous vehicle may switch to the MNO associated with the passenger device in order to obtain improved service. In some cases, the autonomous vehicle may switch to the MNO associated with the passenger device when the MNO associated with the autonomous vehicle is failing to meet operational requirements (e.g., latency increases beyond acceptable threshold).

In some aspects, the present technology can improve the operation of an autonomous vehicle by preventing unnecessary switches to alternative networks. That is, the autonomous vehicle can use the passenger device to obtain network indicators prior to initiating a network switch. In the case that the alternative network has the same or worse metrics, the autonomous vehicle can forgo switching and avoid the downtime associated with such a switch.

FIG. 1 is a diagram illustrating an example autonomous vehicle (AV) environment 100, according to some examples of the present disclosure. One of ordinary skill in the art will understand that, for the AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.).

The perception stack 112 can identify environmental uncertainties, such as where to look for moving objects, flag areas that may be obscured or blocked from view, and so forth. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridehailing service (e.g., a ridesharing service), a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridehailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridehailing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridehailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridehailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridehailing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridehailing platform 160 can interact with a customer of a ridehailing service via a ridehailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridehailing application 172. The client computing device 170 can be a customer's mobile computing device or a computing device integrated with the AV 102 (e.g., the local computing device 110). The ridehailing platform 160 can receive requests to pick up or drop off from the ridehailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridehailing platform 160 may incorporate the map viewing services into the ridehailing application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 5.

Figure 2:
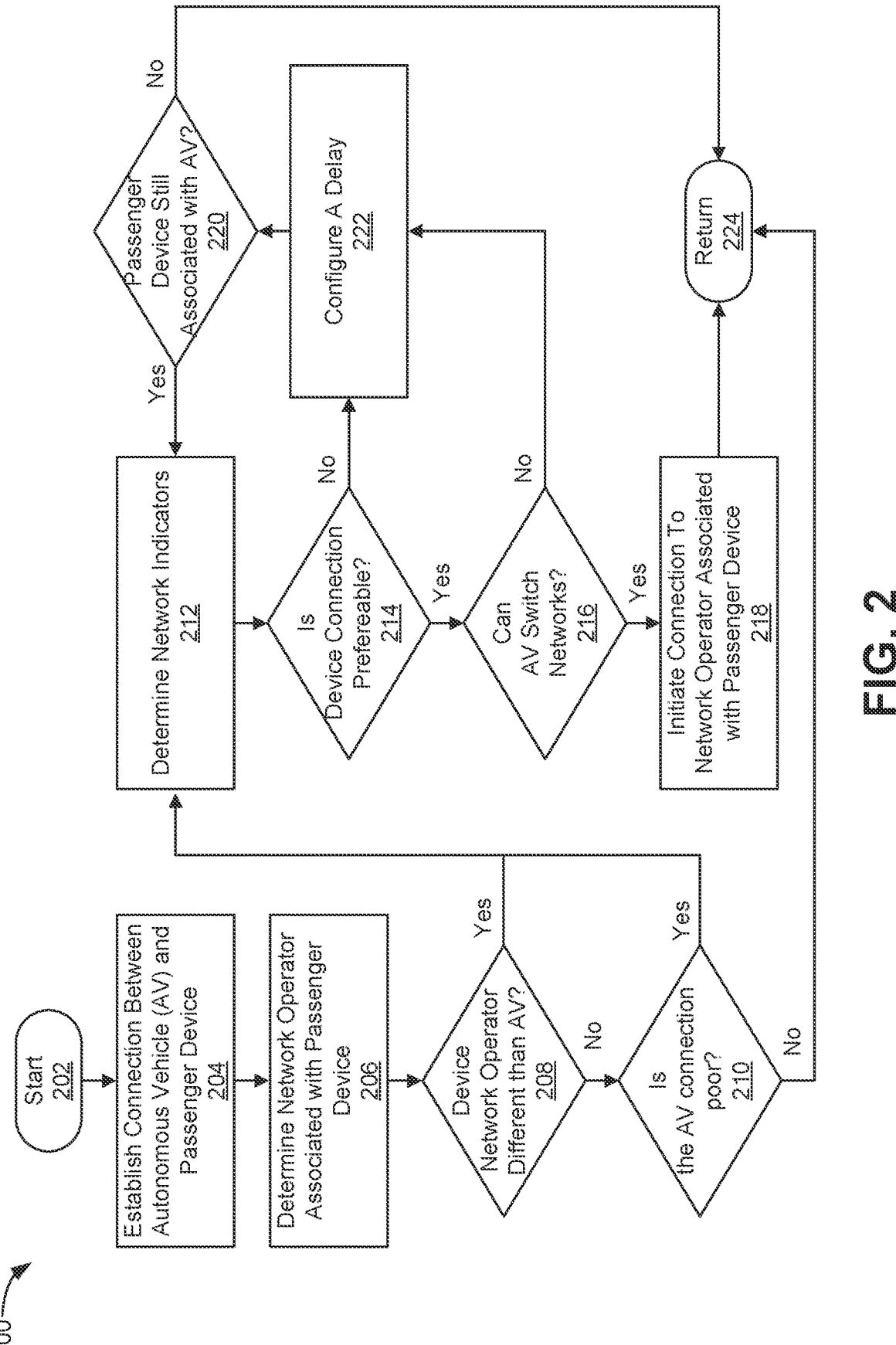
FIG. 2 is a flowchart illustrating an example process for an autonomous vehicle to select a network based on feedback from a passenger mobile device, in accordance with some examples of the present disclosure.

FIG. 2 is a flowchart diagram illustrating an example process 200 for an autonomous vehicle to select a network based on feedback from a passenger mobile device. Although the process 200 depicts a particular sequence of operations, the sequence may be altered without departing from the scope of the present disclosure. For example, some of the operations depicted may be performed in parallel or in a different sequence that does not materially affect the function of process 200. In other examples, different components of an example device or system that implements process 200 may perform functions at substantially the same time or in a specific sequence.

In some aspects, process 200 may start at step 202, which may include initializing of hardware or software systems associated with an AV (e.g., AV 102) and/or with any other computing device that may be configured to execute one or more steps in process 200.

In some examples, at step 204 the process 200 can include establishing a connection between an AV and a passenger device. In some aspects, the AV can correspond to AV 102 and the passenger device can correspond to client computing device 170. In some cases, the connection can be established using a short-range wireless communication protocol such as Bluetooth™ (BT), Wi-Fi, NFC, ultra-wideband (UWB), and/or any other type of short-range wireless communication protocol. In some configurations, the connection may be established using a wired protocol such as a universal serial bus (USB) interface.

In some cases, the connection between the AV and the passenger can be a BT connection that is established using an existing BT profile. For instance, the BT profile may correspond to a Hands-Free Profile in which the passenger device operates as an audio gateway (AG) and the AV operates as a hands-free (HF) unit. In some examples, the BT profile may correspond to a custom profile that is designed to provide a customized interface between the passenger device and the AV. In some aspects, the custom BT profile may be associated with an application on the passenger device such as ridehailing app 172. For example, the ridehailing app 172 may send/receive data using the BT interface on the passenger device.

In some aspects, the AV may prompt the passenger to take action for configuring the connection between the AV and the passenger device. For example, the AV may provide instructions to the passenger using a screen and/or speakers within the AV. In one illustrative example, the AV may display interactive instructions that allow the passenger to select a type (e.g., manufacturer, model, etc.) of passenger device and follow customized directions for accessing device settings to successfully pair the passenger device to the AV. In another example, the AV may provide instructions that direct the user to access an application (e.g., ridehailing app 172) on the passenger device in order to configure the connection between the passenger device and the AV. In another example, the AV may prompt the user to plug in a cable (e.g., USB cable) that connects the passenger device to the AV.

In some aspects, the AV may offer incentives to the passenger in exchange for connecting to the AV and/or for providing authorization to the AV to access information from the passenger device. For example, the AV may offer the passenger a discount on a future ride if the passenger connects the device to the AV and/or downloads and installs an application on the passenger device.

In some configurations, the passenger device may store information that facilitates connections to one or more AVs in a fleet of AVs. For example, after establishing a connection during a first ride, the passenger device may store configuration information so that it can automatically associate with other AVs (e.g., that are part of the same AV fleet) during subsequent rides. In some examples, the application on the passenger device may automatically connect with an AV after receiving authorization from the user.

In some cases, at step 206 the process 200 can include determining the network operator that is associated with the passenger device. In some examples, the network operator may correspond to a mobile network operator (MNO) that operates a cellular network such as AT&T™, Verizon™, T-Mobile™, etc. In some instances, the network operator may correspond to an entity that operates a satellite phone service such as Starlink™, Globalstar™, Amazon™, etc. In some cases, the network operator can be determined using a BT command or query. For example, the HF BT profile provides a communication protocol that permits the passenger device to share the network operator name with the AV. In another example, the ridehailing app on the passenger device may be configured to provide the network operator name to the AV.

In some examples, at step 208, the process 200 can include determining whether the network operator that is associated with the passenger device is different than at least one network operator associated with the AV (e.g., a network operator that is providing network connectivity to the AV). In some aspects, if the AV and the passenger device are not using the same network operator, it may be preferable for the AV to switch to the network operator that is associated with the passenger device in order to obtain improved service. To make such a determination, the process may proceed to step 212 to determine one or more network indicators associated with the network operator for the passenger device and/or the network operator associated with the AV.

In some cases, if the AV and the passenger device are using the same network operator, the process may proceed to step 210 to determine whether the AV connection to the network operator (e.g., same network operator as passenger device) is poor. That is, although the AV and the passenger device are on the same network, the AV and the passenger device may be receiving different levels of service due to one or more factors (e.g., different base stations, different hardware, etc.). In such cases, if the AV connection is poor, the AV may want to determine whether the passenger device is receiving better service from the network operator than the AV.

In some aspects, in order to determine whether the AV connection is poor, the AV may evaluate network indicators and/or parameters such as the signal strength (e.g., received signal strength indicator (RSSI)), the bandwidth, the latency, the round-trip time (RTT), etc. In some aspects, the AV may determine that the connection to the network operator is poor if one or more of these network indicators does not satisfy a threshold operating value (e.g., RTT exceeds a threshold value; RSSI is less than a threshold value; etc.).

In some examples, if the AV determines that the connection is poor (e.g., at step 210) or the AV determines that the passenger device is using a different network operator (e.g., at step 208), the process 200 can proceed to step 212 to determine network indicators associated with the network operator for the passenger device and/or the network operator associated with the AV.

As noted above, network indicators can include any type of indicators, parameters, measurements, attributes, data, etc. that can be used to evaluate the status of a network connection. In some examples, the network indicator may include the radio access technology (RAT) that is associated with a network operator such as 3G, 4G, 5G, 5G ultra-wideband (UWB), LTE, etc. In some aspects, the network indicator may include the signal strength (e.g., RSSI). In some cases, the passenger device may provide information including the RAT and/or the RSSI to the AV via a BT connection, Wi-Fi connection, UWB connection, USB connection, etc.

In some examples, the network indicators may include a latency parameter (e.g., time for data packet to reach destination), an RTT parameter (e.g., time for data packet to travel to/from source), and/or a bandwidth parameter. In some cases, the AV can determine latency, RTT, and/or bandwidth associated with the connection of the passenger device based on communications between the passenger device and a cloud computing device and/or a network server. For example, an application (e.g., ridehailing app 172) on the passenger device can be configured to send/receive data packets to the data center 150 that can be used to measure latency, RTT, and/or bandwidth. In some cases, the latency and/or RTT may be reported by the passenger device to the AV (e.g., via BT, Wi-Fi, etc.). In some examples, the latency, RTT, and/or bandwidth may be reported to the AV by the data center 150.

Similarly, the AV can measure the latency, RTT, and/or bandwidth by communicating with other devices in the network that make use of the connection provided by the network operator. For example, the AV can send and receive data from data center 150 that can be used to measure the latency, RTT, and/or bandwidth of the AV's connection.

In some cases, the network indicators may include information identifying the base station, gNB, access point, etc. that is associated with the passenger device. As noted above, in some examples, devices that are associated with the same network operator may experience different service levels. In some cases, the difference may be because the devices are accessing the network via different nodes (e.g., different base stations). In some instances, the network indicators may include information identifying the hardware and/or software used by the passenger device to access the network.

In some cases, the access point information, the hardware/software information, and/or any other device parameters can be accessed by the AV using an application on the passenger device. That is, the application on the passenger device can request authorization from the user to access device information and share the device information with the AV.

In some examples, the network indicators can include one or more determinations or inferences made by the AV based on passenger activity. For example, the AV may use in-cabin cameras to determine that the passenger is engaged (e.g., watching, typing, etc.) with the passenger device and use this information to infer that the passenger is likely to have a relatively good wireless connection. In another example, the AV may use in-cabin cameras to determine that the passenger is not using the passenger device (e.g., display is off, device is not visible, etc.). In some cases, the passenger may use the passenger device to stream audio to the AV. For example, the passenger device may have a music application installed that can stream music to the AV speakers via the BT connection. In some cases, such streaming activity can be an indication that the passenger device has a relatively good connection to the network.

In some aspects, at step 214 the process 200 can include determining whether the network associated with the passenger device is preferable (e.g., better, superior) to the network associated with the AV. In one example, a network may be preferable if it is associated with a higher signal strength (e.g., RSSI). In another example, a network may be preferable if it is associated with a higher bandwidth. In another example, a network may be preferable if it is associated with a lower latency or RTT. In another example, a network may be preferable based on the RAT (e.g., a 5G connection may be preferable to a 4G connection even if the signal strength of the 4G connection is better than the 5G).

In some cases, determining whether a connection is preferable may include assessing the status of the current connection. That is, although a network indicator may indicate that the passenger device has a better connection, the AV connection may be sufficiently adequate such that the passenger device network is not preferable. For example, although the signal strength of the passenger device may be better than the signal strength of the AV, the AV bandwidth or throughput may be satisfactory such that the passenger device network is not preferable.

In some aspects, if the passenger device connection (e.g., network) is not preferable, the process 200 can proceed to step 222 and the AV can configure a delay (e.g., 1 second, 5 seconds, etc.). After the delay, at step 220 the AV can determine whether the passenger device is still associated (e.g., connected) with the AV. If so, the process can return to step 212 to determine network indicators and repeat step 214 to determine if the network associated with the passenger device is preferable. Alternatively, if the passenger device is no longer associated with the AV, the process 200 can proceed to step 224 and return to prior processing, which may include repeating one or more steps of process 200.

Returning to step 214, if the AV determines that the network associated with the passenger device is preferable, the process 200 can proceed to step 216 to determine whether the AV can switch networks. For example, the AV can determine whether it is engaged in an activity that requires an ongoing connection to the network that should not be interrupted. An example of such an activity may include a session with a remote operator (e.g., remote assistance). That is, the AV may be monitored by a remote operator (e.g., via remote assistance platform 158). In another example, the AV may determine that a current route will take it through a geographic area that may require monitoring (e.g., construction zone, traffic accident, etc.).

Alternatively, in some aspects, the AV may determine that a current state or status is acceptable for switching networks. For instance, the AV may have just arrived at a red light that is expected to take 1-2 minutes to change, during which time the AV will be stationary (e.g., the AV may switch network while stationary and waiting for traffic light to change). In another example, the AV may have just completed a ride-hailing service and dropped off passengers (e.g., the AV may switch networks prior to proceeding to the next pick-up location).

In some aspects, if the AV determines that it cannot switch networks at step 216, the process can proceed to step 222 wherein the AV can configure a delay, as set forth above. Alternatively, if the AV determines that a switch can be completed, the process 200 can proceed to step 218 and the AV can initiate a connection to the network operator associated with the passenger device. In some aspects in which the AV and the passenger device were associated with the same network operator, this step may include re-initiating a connection to the same network operator. For example, the AV may determine that the passenger device is connected to a base station that is in closer proximity than the base station that is currently serving the AV and reinitiating the connection may be favorable because the AV is likely to be associated with a new base station that provides improved service.

After the AV initiates the connection at step 218, the process 200 can proceed to step 224 and return to prior processing, which may include repeating one or more steps of process 200.

Figure 3:
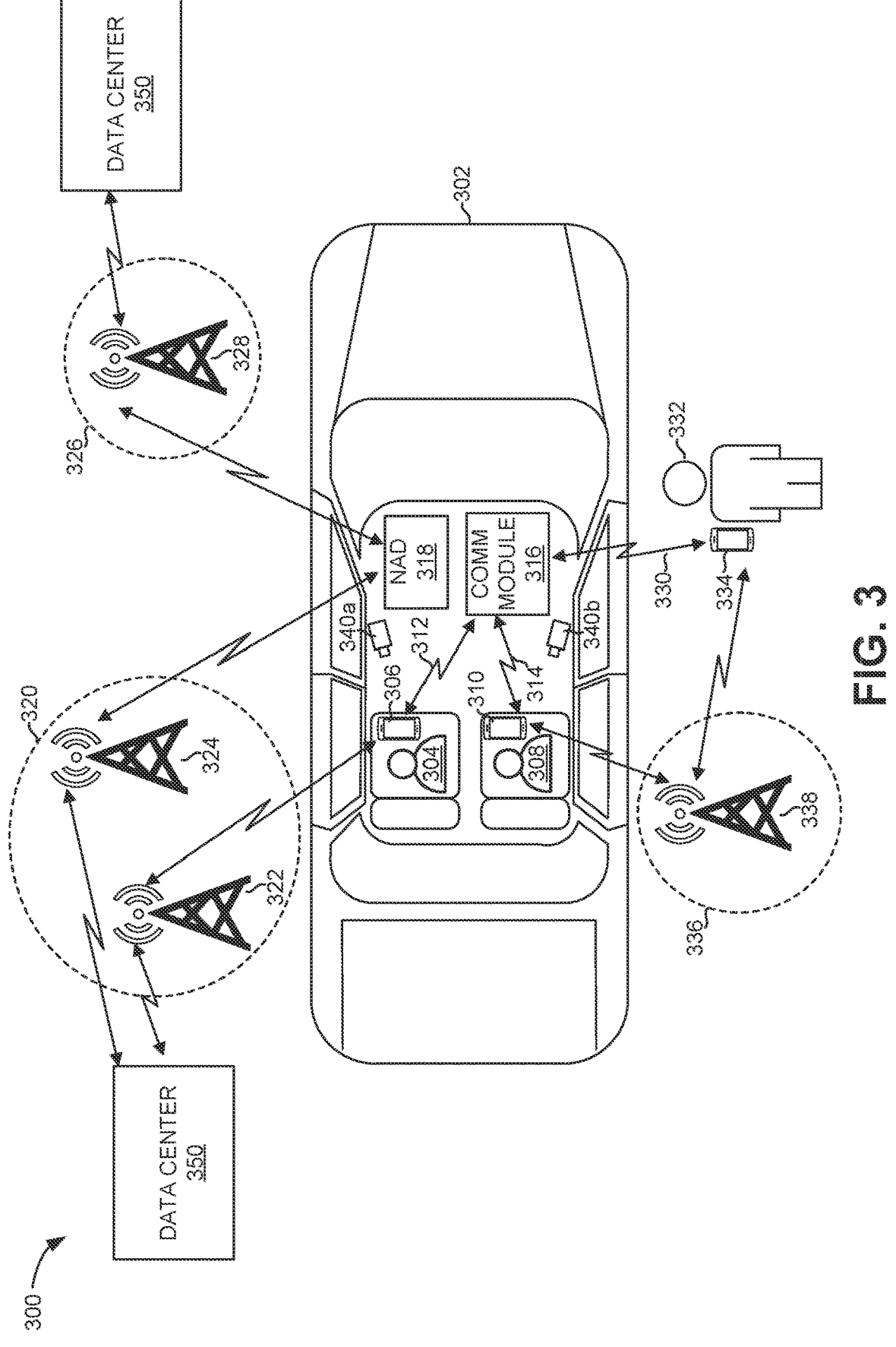
FIG. 3 is a diagram illustrating an example of a system for an autonomous vehicle to select a network based on feedback from a passenger mobile device, in accordance with some examples of the present disclosure.

FIG. 3 is a diagram illustrating an example of a system 300 for an AV to select a network based on feedback from a passenger mobile device. In some aspects, system 300 can include AV 302. In some examples, AV 302 may correspond to AV 102. In some instances, AV 302 may provide ride-hailing and/or ridesharing services to one or more passengers such as passenger 304 and passenger 308. In some cases, passenger 304 may be associated with passenger device 306, and passenger 308 may be associated with passenger device 310. In some instances, passenger device 306 and/or passenger device 310 may correspond to client computing device 170 that can include ridehailing app 172.

In some examples, AV 302 can include a communications module (e.g., comm module 316) that can be configured to connect to passenger device 306 and/or passenger device 310. For example, comm module 316 may include a BT module, a Wi-Fi module, a UWB module, an NFC module, a USB module, and/or any other type of module suitable for establishing communication with passenger device 306 and/or passenger device 310. In some cases, comm module 316 can establish connection 312 with passenger device 306 and/or connection 314 with passenger device 310.

In some aspects, AV 302 may include one or more network access devices (NADs) such as NAD 318. In some examples, NAD 318 may be configured to operate in a dual sim dual standby (DSDS) mode in which NAD 318 may alternatively connect to two different mobile network operators (e.g., MNO 320 or MNO 326). Although AV 302 is illustrated as having a single NAD (e.g., NAD 318), in some aspects, AV 302 may have multiple NADs such that AV 302 can simultaneously connect to multiple MNOs. That is, a first NAD device may be connected to a first MNO and a second NAD device may be connected to a second MNO. In some cases, the AV can maintain a connection between the first NAD device and the first MNO while initiating a new connection between the second NAD device and a third MNO.

In some aspects, NAD 318 may be connected to base station 328 that is associated with MNO 326. Alternatively, NAD 318 may be connected to base station 324 that is associated with MNO 320. In some cases, passenger device 306 may be connected to base station 322 that is associated with MNO 320, and passenger device 310 may be connected to base station 338 that is associated with MNO 336.

In some examples, AV 302 can determine the identity of the MNO that is associated with passenger device 306 using connection 312. In one illustrative example, connection 312 can correspond to a BT connection that AV 302 can use to query passenger device 306 for the name or identity of MNO 320.

In some cases, AV 302 can determine that passenger device 306 is associated with MNO 320, which is different than MNO 326 that is servicing AV 302. In some examples, AV 302 can use connection 312 to determine one or more network indicators associated with MNO 320. For example, AV 302 can use connection 312 to query the RAT and/or the RSSI corresponding to MNO 320

In some instances, AV 302 can determine the latency, RTT, and/or bandwidth associated with MNO 320. For example, passenger device 306 can be configured to send/receive information from data center 350 via MNO 320 that can be used to determine latency, RTT, and/or bandwidth. In some cases, AV 302 can determine the latency, RTT, and/or bandwidth by communicating with passenger device 306 via connection 312. That is, the BT profile may facilitate querying parameters such as latency, RTT, bandwidth, etc. from passenger device 306. In another example, an application on the passenger device can be used to report network indicators to AV 302. In some examples, data center 350 can send the network indicators (e.g., latency, RTT, bandwidth, etc.) to AV 302 (e.g., via MNO 326).

In some cases, AV 302 can determine that passenger device 306 is connected to the same MNO (e.g., MNO 320) as passenger device 306. In some aspects, AV 302 may choose to ignore network indicators from passenger device 306 when it is associated with the same MNO. In some examples, although AV 302 and passenger device 306 are connected to the same MNO (e.g., MNO 320), AV 302 may determine that there is a discrepancy in the quality of the respective connections. For example, passenger device 306 may have a better connection (e.g., higher bandwidth, higher RSSI, lower latency) because passenger device 306 is connected to base station 322, which is different than base station 324 that is serving AV 302. In some aspects, AV 302 may query passenger device 306 to determine configuration information that can include the base station identifier (e.g., base station 322).

In some examples, AV 302 may initiate a connection to a different MNO based on one or more network indicators. For instance, AV 302 may determine that the connection that passenger device 306 has to MNO 320 is more favorable than the connection AV 302 has to MNO 326. In some cases, AV 302 may terminate the connection to MNO 326 and initiate a new connection to MNO 320. Alternatively, AV 302 may terminate and reinitiate a connection with the same MNO if the network indicators suggest that a new connection would provide more favorable metrics. That is, AV 302 can terminate connection with MNO 320 (e.g., via base station 324) and reinitiate the connection to MNO 320 when the network indicators suggest that connecting via base station 322 is more favorable.

In some aspects, AV 302 may collect network indicators from multiple passenger devices. For example, AV 302 may collect network indicators from passenger device 306 and passenger device 310. In some examples, AV 302 may select an MNO based on the network indicators that are more favorable. For example, AV 302 may opt to connect to MNO 336 when the network indicators provided by passenger device 310 are more favorable than the network indicators provided by passenger device 306 (e.g., regarding MNO 320).

In some examples, if two or more passenger devices are connected to the same MNO (not illustrated), AV 302 may simultaneously collect network indicators from each (e.g., based on their respective communications with data center 350). In some aspects, AV 302 may evaluate timestamps associated with the network indicators to determine whether AV 302 has moved. That is, network indicators may become stale if they are based on data that was collected at an earlier time and/or after the AV has traveled a threshold distance.

In some cases, AV 302 may use one or more internal cameras (e.g., camera 340a and camera 340b) to determine user activity with respect to a passenger device. For example, camera 340a and/or camera 340b can be used to determine whether passenger 304 is engaged with passenger device 306 and/or whether passenger 308 is engaged with passenger device 310. In some cases, passenger engagement with a passenger device can be used to infer the quality of a network connection. For example, AV 302 may determine that a wireless connection is relatively good when passenger 304 is watching a video on passenger device 306.

In some examples, AV 302 may use comm module 316 to communicate with one or more user devices that are outside of AV 302. For instance, AV 302 may be located at a stoplight and pedestrian 332 may be standing on the sidewalk adjacent to the intersection. In some cases, AV 302 can establish a connection 330 with user device 334 associated with pedestrian 332. In some instances, pedestrian 332 may include a person that was previously a passenger of AV 302 or of another AV within the same AV fleet as AV 302. In some examples, AV 302 and/or user device 334 may have stored data that facilitates connection 330 without requiring input from pedestrian 332. In some aspects, AV 302 can collect network identifiers associated with MNO 336 by querying user device 334 (e.g., via connection 330).

FIG. 4 illustrates an example of a process 400 for an autonomous vehicle to select a network based on feedback from a passenger mobile device. Although the process 400 depicts a particular sequence of operations, the sequence may be altered without departing from the scope of the present disclosure. For example, some of the operations depicted may be performed in parallel or in a different sequence that does not materially affect the function of process 400. In other examples, different components of an example device or system that implements process 400 may perform functions at substantially the same time or in a specific sequence.

At step 402, the process 400 includes establishing a connection between an autonomous vehicle and a mobile device associated with a passenger of the autonomous vehicle. For example, AV 302 can establish connection 312 between AV 302 and passenger device 306 that is associated with passenger 304. In some aspects, the connection between the autonomous vehicle and the mobile device can include at least one of a Bluetooth connection, a Wi-Fi connection, and an ultra-wideband (UWB) connection. For example, connection 312 and/or connection 314 can include a Bluetooth connection, a Wi-Fi connection, or an ultra-wideband (UWB) connection.

At step 404, the process 400 includes identifying, using the connection, a first mobile network operator associated with the mobile device, wherein the first mobile network operator is configured to provide a first mobile connection between the mobile device and a first mobile network. For example, AV 302 can identify that passenger device 306 is associated with mobile network operator (MNO) 320.

At step 406, the process 400 includes determining that the first mobile network operator associated with the mobile device is different than a second mobile network operator associated with the autonomous vehicle, wherein the second mobile network operator is configured to provide a second mobile connection between the autonomous vehicle and a second mobile network. For instance, AV 302 can determine that MNO 320 associated with passenger device 306 is different than MNO 326 associated with AV 302.

At step 408, the process 400 includes determining, based on a first network indicator associated with the first mobile network and a second network indicator associated with the second mobile network, that the first mobile connection is preferable to the second mobile connection. For example, AV 302 can determine that MNO 320 is preferable to MNO 326 based on network indicators associated with the respective MNOs. In some cases, the first network indicator and the second network indicator can include at least one of a radio access technology (RAT) identifier, a received signal strength indicator (RSSI), a round-trip time (RTT) parameter, a latency parameter, and a bandwidth parameter.

At step 410, the process 400 includes initiating a third mobile connection between the autonomous vehicle and the first mobile network operated by the first mobile network operator. For instance, AV 302 can initiate a mobile connection to MNO 320.

In some examples, the process 400 can include determining that the second network indicator corresponds to a parameter having a value that is less than a minimum threshold value. For example, AV 302 can determine that a network indicator associated with MNO 326 corresponds to a parameter (e.g., RSSI, bandwidth, etc.) that is less than a minimum threshold value. That is, AV 302 can determine that a network indicator associated with the current MNO (MNO 326) is not meeting an operational requirement.

In some aspects, the process 400 can include receiving the first network indicator from a fleet management server, wherein the mobile device is configured to communicate with the fleet management server using the first mobile network. For example, AV 302 can receive the network indicator associated with the connection between MNO 320 and passenger device 306 from data center 350. That is, passenger device 306 can be configured to communicate with data center 350 using MNO 320.

In some examples, the process 400 can include terminating the second mobile connection between the autonomous vehicle and a second mobile network. For instance, AV 302 can terminate the connection between AV 302 and MNO 326.

In some aspects, the process 400 can include providing a prompt to the passenger of the autonomous vehicle, wherein the prompt includes a request to establish the connection between the autonomous vehicle and the mobile device. For example, AV 302 can provide a prompt to passenger 304 that includes a request to establish connection 312 between AV 302 and passenger device 306.

In some configurations, the process 400 can include determining, based on sensor data from at least one cabin camera, that the passenger is using the mobile device and in response, inferring that the first mobile connection is preferable to the second mobile connection. For example, AV 302 can determine, based on camera 340a and/or camera 340b, that passenger 304 is using passenger device 306. In response, AV 302 can infer that the connection between passenger device 306 and MNO 320 is preferable to the connection between AV 302 and MNO 326.

In some cases, the process 400 can include determining that the second mobile connection is in use for a time sensitive communication and configuring a delay prior to initiating the third mobile connection. For example, AV 302 can determine that the mobile connection between AV 302 and MNO 326 is in use for time sensitive communication (e.g., remote assistance session) and in response, AV 302 can initiate a delay prior to initiating a connection to MNO 320.

Figure 5:
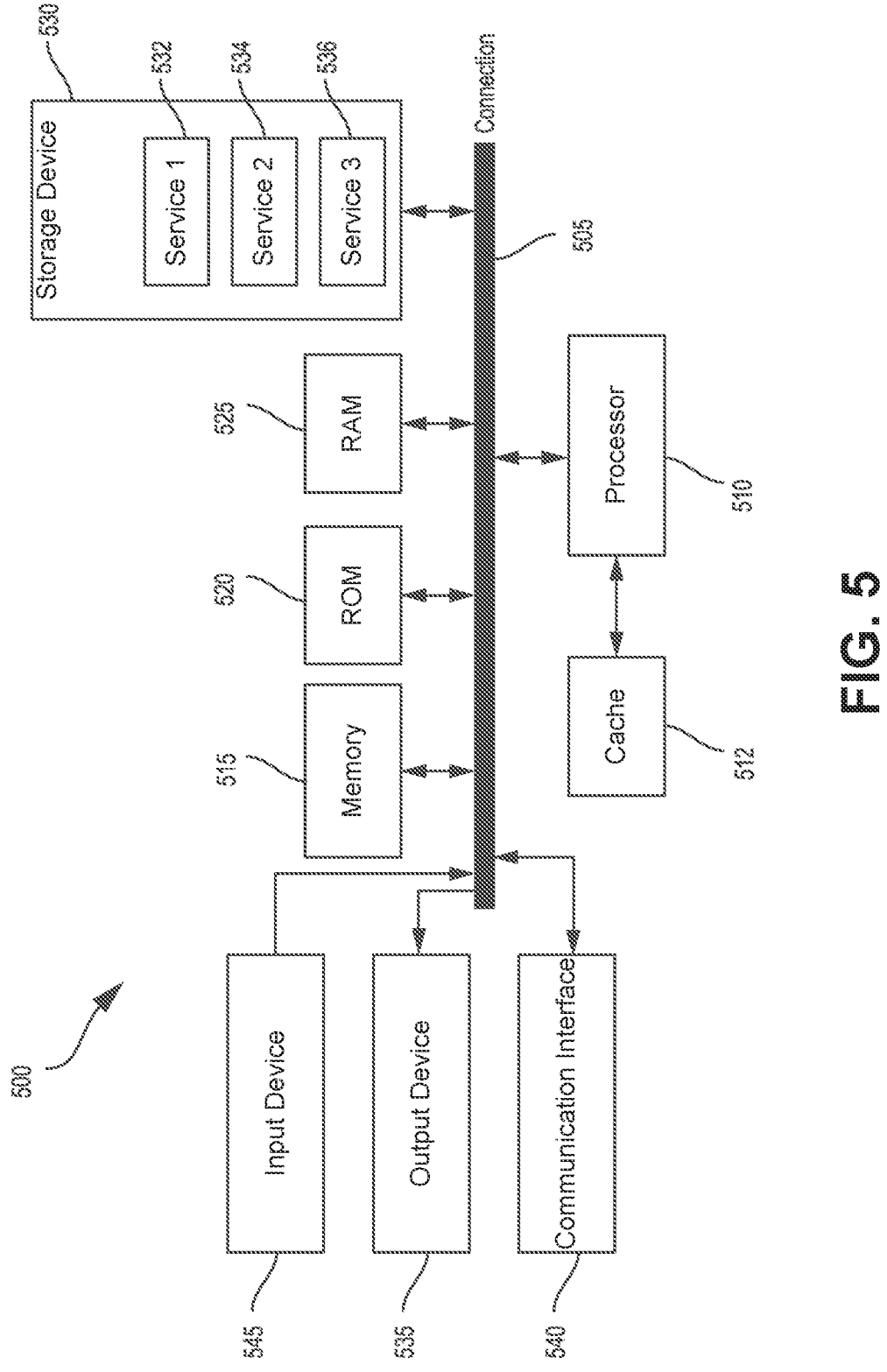
FIG. 5 is a diagram illustrating an example system architecture for implementing certain aspects described herein.

FIG. 5 illustrates an example processor-based system with which some aspects of the subject technology can be implemented. For example, processor-based system 500 can be any computing device making up internal computing system 110, a passenger device executing the ridehailing application 172, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some examples, computing system 500 is a distributed system in which the functions described in this disclosure can be distributed within a datacenter, multiple data centers, a peer network, etc. In some cases, one or more of the described system components represents many such components each performing some or all of the function for which the component is described. In some aspects, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, and/or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 can include an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ultra-wideband (UWB) wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, causes the system to perform a function. In some examples, a hardware service that performs a particular function can include the software component stored in a computer-readable medium in connection with the necessary hardware components, such as processor 510, connection 505, output device 535, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

SELECTED EXAMPLES

Illustrative examples of the disclosure include:

Aspect 1. A method comprising: establishing a connection between the autonomous vehicle and a mobile device associated with a passenger of the autonomous vehicle; identifying, using the connection, a first mobile network operator associated with the mobile device, wherein the first mobile network operator is configured to provide a first mobile connection between the mobile device and a first mobile network; determining that the first mobile network operator associated with the mobile device is different than a second mobile network operator associated with the autonomous vehicle, wherein the second mobile network operator is configured to provide a second mobile connection between the autonomous vehicle and a second mobile network; determining, based on a first network indicator associated with the first mobile network and a second network indicator associated with the second mobile network, that the first mobile connection is preferable to the second mobile connection; and initiating a third mobile connection between the autonomous vehicle and the first mobile network operated by the first mobile network operator.

Aspect 2. The method of Aspect 1, further comprising: determining that the second network indicator corresponds to a parameter having a value that is less than a minimum threshold value.

Aspect 3. The method of any of Aspects 1 to 2, wherein the connection between the autonomous vehicle and the mobile device includes at least one of a Bluetooth connection, a Wi-Fi connection, and an ultra-wideband (UWB) connection.

Aspect 4. The method of any of Aspects 1 to 3, wherein the first network indicator and the second network indicator include at least one of a radio access technology (RAT) identifier, a received signal strength indicator (RSSI), a round-trip time (RTT) parameter, a latency parameter, and a bandwidth parameter.

Aspect 5. The method of any of Aspects 1 to 4, further comprising: receiving the first network indicator from a fleet management server, wherein the mobile device is configured to communicate with the fleet management server using the first mobile network.

Aspect 6. The method of any of Aspects 1 to 5, further comprising: terminating the second mobile connection between the autonomous vehicle and a second mobile network.

Aspect 7. The method of any of Aspects 1 to 6, further comprising: providing a prompt to the passenger of the autonomous vehicle, wherein the prompt includes a request to establish the connection between the autonomous vehicle and the mobile device.

Aspect 8. The method of any of Aspects 1 to 7, further comprising: determining, based on sensor data from at least one cabin camera, that the passenger is using the mobile device; and in response, inferring that the first mobile connection is preferable to the second mobile connection.

Aspect 9. The method of any of Aspects 1 to 8, further comprising: determining that the second mobile connection is in use for a time sensitive communication; and configuring a delay prior to initiating the third mobile connection.

Aspect 10. An apparatus comprising: at least one memory; and at least one processor coupled to the at least one memory, wherein the at least one processor is configured to perform operations in accordance with any one of Aspects 1 to 9.

Aspect 11. An apparatus comprising means for performing operations in accordance with any one of Aspects 1 to 9.

Aspect 12. A non-transitory computer-readable medium comprising instructions that, when executed by an apparatus, cause the apparatus to perform operations in accordance with any one of Aspects 1 to 9.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. An autonomous vehicle comprising:
at least one memory comprising instructions; and
at least one processor coupled to the at least one memory, wherein the at least one processor is configured to:
establish a connection between the autonomous vehicle and a mobile device associated with a passenger of the autonomous vehicle;
identify, using the connection, a first mobile network operator associated with the mobile device, wherein the first mobile network operator is configured to provide a first mobile connection between the mobile device and a first mobile network;
determine that the first mobile network operator associated with the mobile device is different than a second mobile network operator associated with the autonomous vehicle, wherein the second mobile network operator is configured to provide a second mobile connection between the autonomous vehicle and a second mobile network;
determine, based on a first network indicator associated with the first mobile network and a second network indicator associated with the second mobile network, that the first mobile connection is preferable to the second mobile connection; and
initiate a third mobile connection between the autonomous vehicle and the first mobile network operated by the first mobile network operator.

2. The autonomous vehicle of claim 1, wherein the at least one processor is further configured to:
determine that the second network indicator corresponds to a parameter having a value that is less than a minimum threshold value.

3. The autonomous vehicle of claim 1, wherein the connection between the autonomous vehicle and the mobile device includes at least one of a Bluetooth connection, a Wi-Fi connection, and an ultra-wideband (UWB) connection.

4. The autonomous vehicle of claim 1, wherein the first network indicator and the second network indicator include at least one of a radio access technology (RAT) identifier, a received signal strength indicator (RSSI), a round-trip time (RTT) parameter, a latency parameter, and a bandwidth parameter.

5. The autonomous vehicle of claim 1, wherein the at least one processor is further configured to:
receive the first network indicator from a fleet management server, wherein the mobile device is configured to communicate with the fleet management server using the first mobile network.

6. The autonomous vehicle of claim 1, wherein the at least one processor is further configured to:
terminate the second mobile connection between the autonomous vehicle and a second mobile network.

7. The autonomous vehicle of claim 1, wherein the at least one processor is further configured to:
provide a prompt to the passenger of the autonomous vehicle, wherein the prompt includes a request to establish the connection between the autonomous vehicle and the mobile device.

8. The autonomous vehicle of claim 1, wherein the at least one processor is further configured to:
determine, based on sensor data from at least one cabin camera, that the passenger is using the mobile device; and
in response, infer that the first mobile connection is preferable to the second mobile connection.

9. The autonomous vehicle of claim 1, wherein the at least one processor is further configured to:
determine that the second mobile connection is in use for a time sensitive communication; and
configure a delay prior to initiating the third mobile connection.

10. A method comprising:
establishing a connection between an autonomous vehicle and a mobile device associated with a passenger of the autonomous vehicle;
identifying, using the connection, a first mobile network operator associated with the mobile device, wherein the first mobile network operator is configured to provide a first mobile connection between the mobile device and a first mobile network;

determining that the first mobile network operator associated with the mobile device is different than a second mobile network operator associated with the autonomous vehicle, wherein the second mobile network operator is configured to provide a second mobile connection between the autonomous vehicle and a second mobile network;

determining, based on a first network indicator associated with the first mobile network and a second network indicator associated with the second mobile network, that the first mobile connection is preferable to the second mobile connection; and initiating a third mobile connection between the autonomous vehicle and the first mobile network operated by the first mobile network operator.

11. The method of claim 10, further comprising:

determining that the second network indicator corresponds to a parameter having a value that is less than a minimum threshold value.

12. The method of claim 10, wherein the connection between the autonomous vehicle and the mobile device includes at least one of a Bluetooth connection, a Wi-Fi connection, and an ultra-wideband (UWB) connection.

13. The method of claim 10, wherein the first network indicator and the second network indicator include at least one of a radio access technology (RAT) identifier, a received signal strength indicator (RSSI), a round-trip time (RTT) parameter, a latency parameter, and a bandwidth parameter.

14. The method of claim 10, further comprising:

receiving the first network indicator from a fleet management server, wherein the mobile device is configured to communicate with the fleet management server using the first mobile network.

15. The method of claim 10, further comprising:

terminating the second mobile connection between the autonomous vehicle and a second mobile network.

16. The method of claim 10, further comprising:

providing a prompt to the passenger of the autonomous vehicle, wherein the prompt includes a request to establish the connection between the autonomous vehicle and the mobile device.

17. The method of claim 10, further comprising:

determining, based on sensor data from at least one cabin camera, that the passenger is using the mobile device; and in response, inferring that the first mobile connection is preferable to the second mobile connection.

18. The method of claim 10, further comprising:

determining that the second mobile connection is in use for a time sensitive communication; and configuring a delay prior to initiating the third mobile connection.

19. A non-transitory computer-readable storage medium having stored thereon instructions which, when executed by one or more processors, cause the one or more processors to:

establish a connection between an autonomous vehicle and a mobile device associated with a passenger of the autonomous vehicle;

identify, using the connection, a first mobile network operator associated with the mobile device, wherein the first mobile network operator is configured to provide a first mobile connection between the mobile device and a first mobile network;

determine that the first mobile network operator associated with the mobile device is different than a second mobile network operator associated with the autonomous vehicle, wherein the second mobile network operator is configured to provide a second mobile connection between the autonomous vehicle and a second mobile network;

determine, based on a first network indicator associated with the first mobile network and a second network indicator associated with the second mobile network, that the first mobile connection is preferable to the second mobile connection; and initiate a third mobile connection between the autonomous vehicle and the first mobile network operated by the first mobile network operator.

20. The non-transitory computer-readable storage medium of claim 19, wherein the first network indicator and the second network indicator include at least one of a radio access technology (RAT) identifier, a received signal strength indicator (RSSI), a round-trip time (RTT) parameter, a latency parameter, and a bandwidth parameter.

* * * * *